(12) United States Patent
Jokschas et al.

(10) Patent No.: US 8,038,872 B2
(45) Date of Patent: Oct. 18, 2011

(54) FILTERING DEVICE FOR FLUIDS, IN PARTICULAR FOR FUEL

(75) Inventors: Günter Jokschas, Murrhardt (DE); Frank Muschkiet, Föritz (DE); Michael Fasold, Auenwald (DE); Gunther Kraft, Ludwigsburg (DE); Stefan Uhl, Fellbach (DE); Thomas Friederich, Kornwestheim (DE); Oliver Krauss, Weinsberg (DE)

(73) Assignee: Mann + Hummel GmbH, Ludwigsburg (DE)

( * ) Notice: Subject to any disclaimer, the term of this patent is extended or adjusted under 35 U.S.C. 154(b) by 6 days.

(21) Appl. No.: 12/755,692

(22) Filed: Apr. 7, 2010

(65) Prior Publication Data
US 2010/0258491 A1     Oct. 14, 2010

(30) Foreign Application Priority Data
Apr. 8, 2009    (DE) .................. 10 2009 016 601

(51) Int. Cl.
*F02M 37/22*    (2006.01)
*B01D 35/18*    (2006.01)
(52) U.S. Cl. .......................... 210/86; 210/184
(58) Field of Classification Search .............. None
See application file for complete search history.

(56) References Cited

U.S. PATENT DOCUMENTS

| | | | | |
|---|---|---|---|---|
| 3,237,770 A * | 3/1966 | Humbert, Jr. | .................. | 210/94 |
| 4,010,101 A * | 3/1977 | Davey | .................. | 210/86 |
| 4,276,161 A * | 6/1981 | Matsui et al. | .................. | 210/86 |
| 4,276,179 A * | 6/1981 | Soehngen | .................. | 210/679 |
| 4,318,772 A * | 3/1982 | Kragh | .................. | 210/712 |
| 4,321,136 A * | 3/1982 | Matsui | .................. | 210/86 |
| 4,387,691 A * | 6/1983 | Marcoux et al. | .................. | 123/557 |
| 4,406,785 A * | 9/1983 | Siefer | .................. | 210/186 |
| 4,437,986 A * | 3/1984 | Hutchins et al. | .................. | 210/130 |
| 4,470,301 A * | 9/1984 | Hutchins et al. | .................. | 73/304 R |
| 4,473,054 A * | 9/1984 | Marcoux et al. | .................. | 123/557 |
| 4,479,477 A * | 10/1984 | Manchester | .................. | 123/557 |
| 4,488,970 A * | 12/1984 | Clark | .................. | 210/746 |
| 4,501,255 A * | 2/1985 | Van Der Ploeg et al. | ..... | 123/557 |
| 4,539,108 A * | 9/1985 | Izutani et al. | .................. | 210/104 |
| 4,539,109 A * | 9/1985 | Davis | .................. | 210/104 |
| 4,562,431 A * | 12/1985 | Jahnke et al. | .................. | 340/604 |
| 4,585,924 A * | 4/1986 | Pakula | .................. | 219/205 |
| 4,596,224 A * | 6/1986 | Prager | .................. | 123/557 |
| 4,619,764 A * | 10/1986 | Church et al. | .................. | 210/248 |
| 4,624,779 A * | 11/1986 | Hurner | .................. | 210/180 |
| 4,680,110 A * | 7/1987 | Davis | .................. | 210/114 |
| 5,110,460 A * | 5/1992 | Gilas | .................. | 210/149 |
| RE34,166 E * | 1/1993 | Davis | .................. | 123/557 |
| 5,211,845 A * | 5/1993 | Kaneshige | .................. | 210/186 |
| 5,213,682 A * | 5/1993 | Richardson | .................. | 210/86 |

(Continued)

FOREIGN PATENT DOCUMENTS

EP       1092461 A1 *   4/2001

(Continued)

*Primary Examiner* — Robert James Popovics
(74) *Attorney, Agent, or Firm* — James Hasselbeck

(57) ABSTRACT

A filtering device for fluids features a filter element located in a filter housing and a heating device located in the flow path of the fluid. The heating device comprises a heating element that is held by a heating support which is located at the inner surface of the cover, with a water outlet connection being designed as one-piece with the heating support, the water outlet connection being directed outwards through a recess in the cover.

13 Claims, 3 Drawing Sheets

U.S. PATENT DOCUMENTS

| | | | |
|---|---|---|---|
| 6,207,045 B1* | 3/2001 | Jiang | 210/86 |
| 6,709,576 B2* | 3/2004 | Jokschas | 210/114 |
| 6,852,217 B2* | 2/2005 | Jokschas et al. | 210/86 |
| 6,881,328 B2* | 4/2005 | Dittmann et al. | 210/86 |
| 6,974,537 B2* | 12/2005 | Abdelqader | 210/86 |
| 6,994,784 B2* | 2/2006 | Jainek | 210/149 |
| 7,048,851 B2* | 5/2006 | Decaux | 210/186 |
| 7,368,060 B2* | 5/2008 | Faxides | 210/744 |
| 7,396,473 B1* | 7/2008 | Guynn | 210/774 |
| 7,708,879 B2* | 5/2010 | Girondi | 210/86 |
| 2002/0038780 A1* | 4/2002 | Jokschas et al. | 210/86 |
| 2002/0050469 A1* | 5/2002 | Jokschas | 210/114 |
| 2005/0103728 A1* | 5/2005 | Abdelqader | 210/774 |
| 2006/0070956 A1* | 4/2006 | Herrmann et al. | 210/744 |
| 2006/0157421 A1* | 7/2006 | Faxides | 210/739 |
| 2007/0221560 A1* | 9/2007 | Girondi | 210/232 |
| 2008/0037967 A1* | 2/2008 | Fasold et al. | 392/451 |
| 2008/0197064 A1* | 8/2008 | Blasco Remacha et al. | 210/184 |
| 2008/0217231 A1* | 9/2008 | Gama et al. | 210/184 |
| 2010/0200485 A1* | 8/2010 | Parra Navarrete et al. | 210/184 |
| 2010/0258491 A1* | 10/2010 | Jokschas et al. | 210/181 |
| 2011/0000833 A1* | 1/2011 | Eberle | 210/104 |
| 2011/0017657 A1* | 1/2011 | Jokschas et al. | 210/437 |
| 2011/0036770 A1* | 2/2011 | Jokschas et al. | 210/440 |

FOREIGN PATENT DOCUMENTS

| | | | |
|---|---|---|---|
| EP | 1163944 A1 * | 12/2001 | |
| EP | 1172549 A2 * | 1/2002 | |
| EP | 2239034 A2 * | 10/2010 | |

* cited by examiner

FILTERING DEVICE FOR FLUIDS, IN PARTICULAR FOR FUEL

CROSS REFERENCE TO RELATED APPLICATIONS

This application claims the benefit under 35 USC 119 of foreign application 10 2009 016 601.7 filed in Germany on Apr. 8, 2009, and which is hereby incorporated by reference in its entirety.

TECHNICAL FIELD

The invention relates to a filtering device for fluids, in particular for fuel in an internal combustion engine.

BACKGROUND OF THE INVENTION

DE 10 2006 034 077 A1 describes a liquid filter which is equipped with a heating device for heating the medium flowing through the filtering device. The heating device is designed as heating track which can be heated with electric power and which is injected into the filter housing. The heating track is integrated into the wall of the pot-shaped filter housing and encompasses the filter element in a ring-shaped manner at its exterior side which represents the raw side so that the fluid reaching the raw side is heated by the heating track.

A heating device, which features positive temperature coefficient (PTC) heating elements which are disposed at the front side of the housing, is known from EP 0 162 939 A1. The PTC elements are located at a cover of the housing through which the Diesel fuel flows in and out. The cover which is attachable to the front side of the pot-shaped housing features a flow chamber between an outside located and an inside located cover shell for guiding the flow, the PTC elements being disposed at the side of the inner housing shell facing the housing pot.

The task of the invention is to realize a filtering device for fluids in compact design by means of simple constructional features in such a way that a quick heating of the fluid along with an easy installation and maintenance is ensured.

SUMMARY OF THE INVENTION

The filtering device according to the invention can generally be used for filtering fluids, in particular liquids. Additionally using the filtering device with gaseous fluids is possible. In the preferred embodiment, the filtering device is used for filtering fuel in internal combustion engines. The filtering device is particularly suitable for heating and filtering Diesel fuel.

The filtering device features in a filter housing a filter element through which the fluid flows. To heat the fluid prior to being filtered a heating device is disposed upstream the filter element in the flow path of the fluid to preheat the fluid before it enters the filter element. The heating device is located at the interior side of a cover that closes the preferably pot-shaped filter housing.

The heating device comprises a heating element that is held by a heating support which is located at the interior side of the cover. The heating support is designed as one-piece with a water outlet connection which communicates with a drainage channel in the filter housing, the drainage channel being connected with the heating support. The water outlet connection is directed outwards through a recess in the cover.

This embodiment adds some functions to the heating support. On the one hand, not only the heating element is disposed at the heating support, but also the drainage channel through which separated water can be discharged from the filtering device. On the other hand, the water outlet connection is designed as one-piece with the heating support which is flow-connected with the drainage channel, a compact and reduced component being achieved due to the one-piece design of water outlet connection and heating support. The heating support can be inserted into the pot-shaped filter housing as a preassembled module which comprises also the drainage channel, whereupon the cover can be placed in such a way that the water outlet connection projects through the recess in the cover. Thus, the heating support including the components attached to it—heating element, water outlet connection, and drainage channel—can be inserted easily as a preassembled module into the filter housing, at the same time, placing the cover fixes the heating support securely.

According to an appropriate further embodiment it is envisioned that electric contact pins are connected with the heating support and a water level detector and passed through a recess in the cover. The contact pins are in particular used to realize an electric connection of a water level detector installed in the filtering device which measures the water level of the separated water in the filter housing. The water level detector is preferably installed in or at the drainage channel. Therefore, the heating support has the additional function to accept the contact pins and, via the drainage channel, the water level detector. Consequently, the heating support is supporting the water outlet connection, the drainage channel, the electric contact pins, and the water level detector. This module is installed in the filter housing when mounted and secured in the desired position when the cover in the filter housing is closed. To compensate component and manufacturing tolerances, a spring element which ensures a non-positive fixing of the module at the cover is disposed between the filter element and the filter housing bottom. At the same time, by placing the cover the electric connection at the contact pins as well as the flow connection to the water outlet connection is carried out easily.

According to another advantageous embodiment a fluid inlet fitting and a fluid outlet fitting are also connected with the heating support and passed through recesses in the cover, the fluid to be cleaned or already cleaned flowing in or out of the filtering device via the fluid inlet fitting and the fluid outlet fitting. Consequently, altogether several recesses are provided in the cover through which project the water outlet connection, the contact pins, the fluid inlet fitting and the fluid outlet fitting. Thus, all connections are realized via the front side of the filtering device in the area of the cover. Other connections are not necessary.

Furthermore it may be appropriate to integrally mold sealing lips at the drainage channel and, if required, also at the outlet fitting which remain in sealing contact with the adjacent components. In case of the drainage channel a central tube bearing the filter element is sealed, in case of the outlet fitting the heating support and/or the component connected with the drainage channel is sealed. Thus, additional sealing elements are not required at the drainage channel and the outlet fitting.

The heating support is preferably designed as plastic part, the same applies to the components forming one piece with the heating support, for example the water outlet connection. The drainage channel is also preferably designed as plastic part.

The heating device comprises preferably a heat-conducting plate as well as a heating element which heats the heat-conducting plate. The fluid passes along the heat-conducting plate so that the heat enters the fluid via the heat-conducting plate.

This embodiment has several advantages. On the one hand, a large-area contact between the heat-conducting plate and the fluid is possible, ensuring the fluid being quickly heated. On the other hand, the heat-conducting plate, too, can be quickly heated by the heating element, so that the heat input from the heating element to the heat-conducting plate and further from the heat-conducting plate to the fluid is realized in a shorter time.

Furthermore, such heat-conducting plates can be manufactured easily, in particular of conductive material, for example of metal, so that the heat-conducting plates may also be used for current conduction. Especially when two heat-conducting plates disposed to each other in parallel are provided, a closed electric circuit conducting electrical power to the heating element can be realized via the heat-conducting plates. In case of several heat-conducting plates, the heating element is disposed in a preferred embodiment in the intermediate space between the plates.

However, only one heat-conducting plate to which a heating element is allocated is usually sufficient to ensure that the heat enters the fluid. It may be appropriate that both lateral surfaces of the heat-conducting plate form flow and/or heating surfaces for the fluid which passes accordingly along both sides of the heat-conducting plate.

According to the preferred embodiment at least two parallel heat-conducting plates are disposed which define an intermediate flow chamber. Thus, it is possible to guide the fluid to be heated along both exterior sides as well as in the intermediate space, so that despite the limited dimensions of the heat-conducting plate a relatively large heating surface is available. In this so-called sandwich design it may be appropriate that all lateral surfaces of the heat-conducting plates serve as flow and/or heating surfaces. Furthermore, and as already mentioned before, the at least one heating element can be positioned in the intermediate space, the power to the heating element is advantageously supplied via the heat-conducting plates which are made of an electrically conductive material.

According to another advantageous embodiment a flow opening is realized in the heat-conducting plate through which the fluid to be heated can flow. The flow opening allows a transfer of the fluid between the axial lateral surfaces of the heat-conducting plate. Due to several deflections in the area of the heat-conducting plates, the flow bypasses the lateral surfaces of the heat-conducting plate.

The heat-conducting plate is in particular circular or annular and of planar design, so that the sandwich design forms a cylindrical and/or hollow cylindrical embodiment of the heating device with a heating element located between the heat-conducting plates which are disposed to each other in parallel and centrically. In this embodiment, the heating device is advantageously disposed at one front side of the preferably pot-shaped filter housing, in particular in the cover area with which the heating device can also be connected.

However, an embodiment with bent heat-conducting plates is also possible, but in case of a plurality of heat-conducting plates they are advantageously disposed concentrically to each other to define an intermediate flow chamber for the fluid to be heated. For example, the heat-conducting plates can be designed hollow cylindrically and encompass the also hollow cylindrical filter element in a ring-shaped manner with a radial distance to the on-flow side of the filter element.

If the embodiment of the planar heat-conducting plate is disk- or ring-shaped, it should be particularly considered to attach it at the interior side of the cover of the pot-shaped filter housing via which the fluid to be cleaned passes axially into the housing interior. At first, the fluid flows through the heating device which, in this embodiment, consists preferably of two parallel heat-conducting plates with at least one heating element between them, the fluid passes after the heating phase to the radial exterior side of the filter element which is flowed through radially from outside to inside. The cleaned fluid is then discharged via the interior area of the filter element in axial direction.

The complete filtering device can be designed as disposable part, in which the housing cover placed onto the filter cup is firmly connected with the filter cup, for example by hemming the cover edge. The disk-shaped heat-conducting plates are located advantageously between the axial front side of the cylindrical filter element and the interior side of the housing cover. The filter cup and the filter cover as well can be designed as metal parts which are tightly connected with each other (hemmed, if required also soldered or welded). The filtering device forms advantageously an inseparable unit consisting of filter cup, filter cover with filter element, heating device, water level detector, water discharge pipe, fluid intake pipe, and fluid discharge pipe. The electric contacts and the water discharge pipe are passed in a plastic part through an opening through the cover and sealed with a sealing flange. Fluid intake pipe and fluid discharge pipe are soldered with the cover. The electric conductors for both contacts for the water level detector are overmolded by plastic in a large area and consequently isolated from each other.

The heating element is preferably located directly at one of the lateral surfaces of the heat-conducting plate, the heating element being disposed in the intermediate space between the plates in case of two parallel disposed heat-conducting plates. To ensure a quicker heating a plurality of heating elements can be provided which are disposed either at different sides of the heat-conducting plate or at the same side.

The heating element is preferably disk-shaped and designed as electric PTC element (positive temperature coefficient).

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
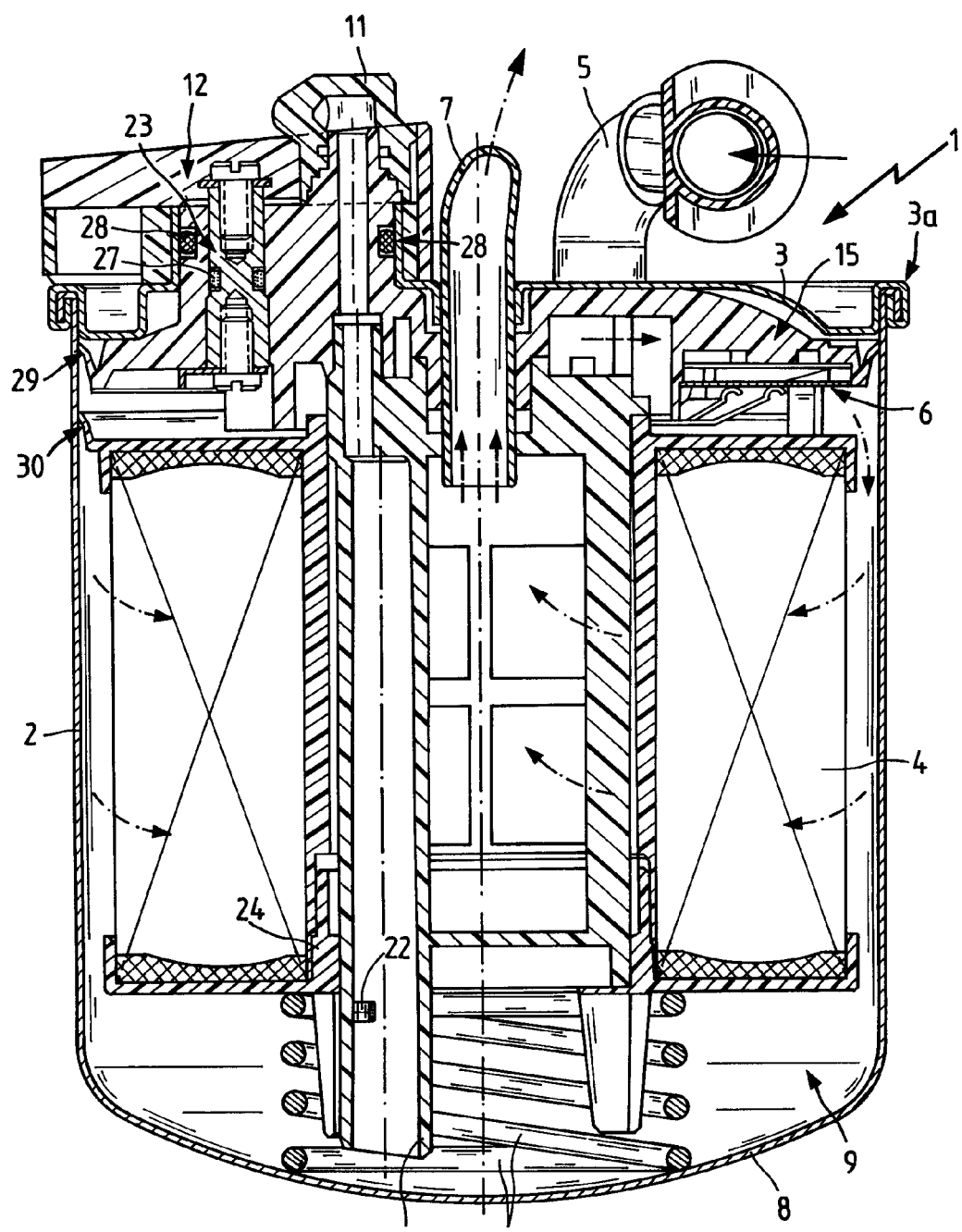
FIG. 1 depicts a section through a fuel filter with a heating device disposed at the interior side of the housing cover, consistent with the present invention.

The figures show identical components with the same numeric reference labels.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a filtering device for fluids. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The filtering device 1 shown in FIG. 1 is a fuel filter consisting of a cylindrical and pot-shaped filter housing 2 with a housing cover 3 and a ring-shaped and/or hollow cylindrical filter element 4 insertable into the filter housing 2 which is provided with an inside located framework-type plastic central tube 24. An inlet fitting 5 for feeding the fluid to be cleaned is disposed at the housing cover 3 which is to be firmly connected by means of a hemmed edge 3a with the axially free front side of the filter housing 2. The fluid fed into the housing interior is heated in a heating device 6 and then, as indicated by the arrows, passes to the exterior side of the ring-shaped filter element 4 which is also the raw side. The heated unfiltered fluid then passes in radial direction from outside to inside through the material of the filter element 4 and is discharged axially via an outlet fitting 7 which is also disposed in the area of the cover 3. The filter material for the filter element 4 consists of filter paper, fleece as separation medium or a combination of different filter materials known to the person skilled in the art being also appropriate. The fluid inlet fitting 5 and the fluid outlet fitting 7 are passed through recesses in the cover 3. Outlet and inlet fitting for the fuel are tightly connected with the cover, for example soldered.

Between the cup bottom 8 and the axial bottom side of the filter element 4 is located in the housing interior a water-collecting chamber 9 in which the separated water can be collected. A drainage channel 10 which leads to the top up to a water outlet connection 11 provides a flow connection between the water collecting chamber 9 and the water outlet connection 11. The water collected in the collecting chamber 9 can be discharged via the water outlet connection 11. The water outlet connection 11 projects through a recess in the cover 3. As soon as the water outlet connection 11 or a hose or duct section attached to it is opened, the separated water is pressed out by the pressure in the fuel supply system. This is different from systems known from prior art with water drain plug where the water is discharged by gravity.

Furthermore, a connection block 12 which serves as electric contact in particular for the heating device 6 and the water level detector 22 is disposed at the exterior side of the housing cover 3. Parts of the connection block 12 are contact pins 23 which are also passed through a recess in the cover 3. A water level detector 22 which is disposed in the lower part of the drainage channel 10 and via which the current water level can be detected in the collecting chamber 9 is electrically connected via the contact pins 23 which are made of metal. To realize an electrically closed circuit both contact pins 23 are connected each with a conductor, both conductors being injected into the wall of the drainage channel 10 and leading to the sensor 22 which features two electric contacts allocated each to a conductor, the electric contacts being conducting electric current upon rising water level. To ensure the electric supply of heating device 6 and water level detector 22 three contact pins are provided altogether, because the neutral conductor of both units can be joined to form one contact pin.

Each contact pin 23 is surrounded by an O-ring 27 by which a flow-tight sealing to the heating support 15 is achieved into which the contact pins 23 are incorporated.

The heating support 15 made of plastic which supports the heating elements 16 (FIG. 2) is located at the interior side of the cover. The water outlet connection 11 is designed separately from the heating support 15, but it can also be designed as one-piece with the heating support 15, if required.

The fluid inlet fitting 5 and the fluid outlet fitting 7 communicate with the heating support 15, however, they are formed by the cover. In an alternative embodiment, these fittings can also be designed as one-piece with the heating support. Furthermore, the drainage channel 10 is also linked with the heating support 15, the drainage channel 10 being designed as separate component. However, it could also be appropriate to design the drainage channel as one-piece with the heating support. A channel which connects the drainage channel 10 with the water outlet connection 11 is located in the heating support 15. An O-ring 28 for sealing the heating support 15 from the cover 3 is placed around the upper section of the heating support 15 which contains the channel that communicates with the drainage channel 10 and the water outlet connection 11. For connecting the heating support 15 and the water outlet connection 11a fir-tree profile for firmly connecting the components can be disposed at the water outlet connection 11 and/or at a section of the heating support 15. Thus, the heating elements, the water outlet connection, the drainage channel and the contact pins 23 are allocated to the heating support 15. Together with the water level detector 22 which is disposed at the drainage channel 10 these components form a common module to be preassembled which is inserted into the cover during installation and fixed by placing the filter housing. A spring element 26 pushes against an axial lower end of the filter element 4 and fixes the module in a non-positive manner at the interior side of the cover. In doing so, component and installation tolerances are compensated in axial direction of the filtering device.

In an alternative embodiment, the preassembled module is inserted into the filter housing during installation and fixed by placing the cover.

All connections are realized via the cover side, for the electric contact pins and the water outlet connection project through recesses in the cover. The fluid inlet fitting 5 and the fluid outlet fitting 7 are attached to the cover and communicate with the interior area of the filter housing through an opening.

A circumferential sealing lip 29 which abuts and forms a seal against the interior side of the filter housing 2 is integrally molded to the heating support 15. Another sealing lip 30 is integrally molded to an end plate which closes the upper part of the cylindrical filter element, the end plate also abutting and forming a seal against the interior side of the filter housing 2, however, it does not extend over the complete circumference but forms a free angular segment so that the fuel heated in the heating support 15 can flow from the area above the filter element downwards to the raw side of the filter element.

These sealing lips 29, 30 define the flow area of the fuel in the area of the heating support. Thus, the fluid cannot bypass the heating device 6 and flow along the filter housing wall into the area of the filter element 4. The sealing lips 29, 30 can be designed as one piece with the heating support 15 (sealing lip 29) and made of the same material or with the end plate of the filter element 4 (sealing lip 30).

Figure 1A:
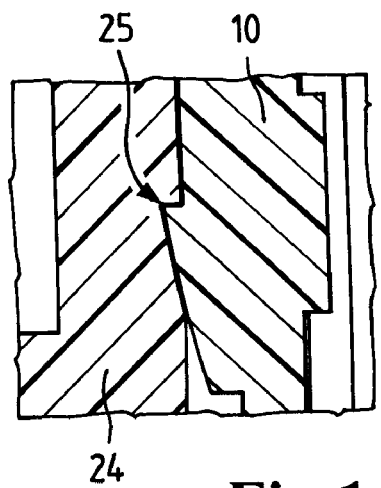
FIG. 1a depicts an enlarged view of the contact area between a drainage channel and a central tube supporting the filter element.

FIG. 1a shows a sectional view of the contact area between the drainage channel 10 and the central tube 24. A sealing lip 25 which is in contact with the central tube 24 is integrally molded to the exterior side of the drainage channel 10. In doing so, a flow-tight connection between drainage channel 10 and central tube 24 with the filter element 4 is ensured, so that additional sealing measures such as, for example, sealing flanges are not required.

Such a sealing by means of integrally molded sealing lips is also advantageously realized at the outlet fitting 7 against the heating support 15 or against a component connected with the drainage channel, so that additional sealing elements are also not required at the outlet fitting 7.

Figure 2:
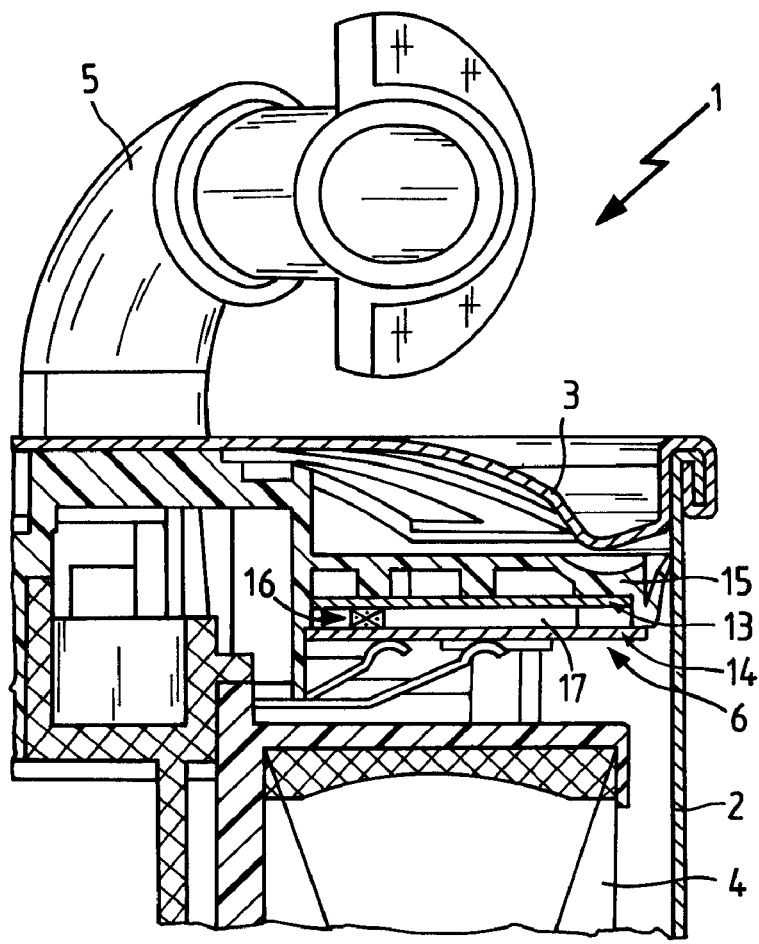
FIG. 2 presents an enlarged sectional view of the fuel filter in the cover area.

FIG. 2 shows an enlarged drawing of the heating device 6 when installed in the filtering device 1. The heating device 6 is located axially between the top front side of the filter element 4 and the interior side of the housing cover 3. The heating device 6 comprises two heat-conducting plates 13 and 14 which have a ring-shaped design and are disposed centrically to the central longitudinal axis of the filtering device 1. Both heat-conducting plates 13 and 14 which consist in particular of an electrically conductive material, preferably of metal, are placed concentrically and basically parallel to each other and define an intermediate fluid chamber 17. Both heat-conducting plates 13 and 14 are heated by heating elements 16 which are preferably disposed between the two heat-conducting plates 13 and 14.

To heat the supplied fluid it passes over the exterior and/or interior side of the heat-conducting plates 13 and 14. The flow is realized advantageously in such a way that at first the exterior side of the heat-conducting plate 13 facing the heating support 15 is in contact with the fluid which then passes into the intermediate fluid chamber 17. The flow then passes to the exterior side of the lower heat-conducting plate 14 facing the filter element 4, whereupon the flow axially reaches in the area of the filter housing 2 the unfiltered fluid chamber between the exterior side of the filter element 4 and the interior side of the pot-shaped filter housing 2.

The heating support 15 is advantageously designed as plastic component and supports both heat-conducting plates 13 and 14. For this purpose, a thermoplastic with glass filling, for example polyamide PA6 with fiberglass filling, is specially suited.

Figure 3:
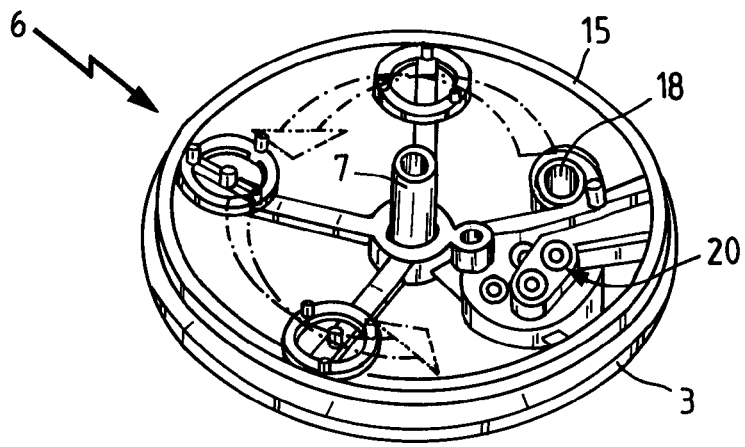
FIG. 3 depicts the heating device with a heating support located at the interior side of the cover.
Figure 4:
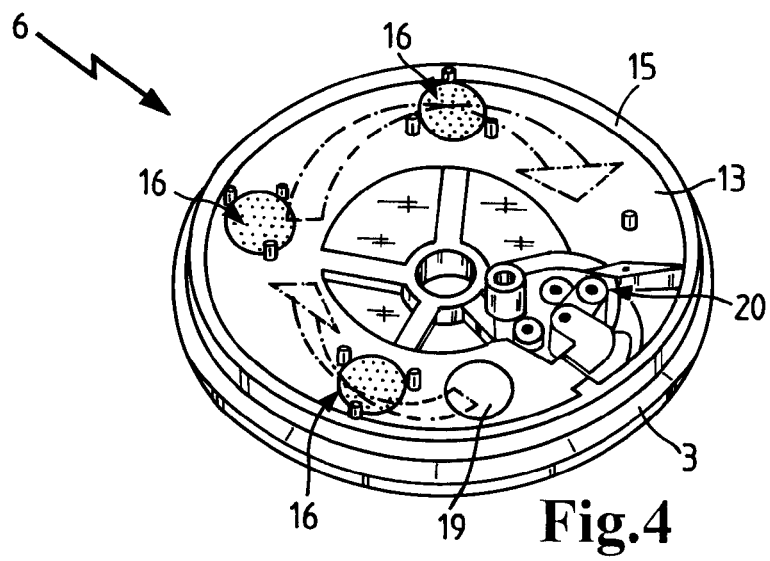
FIG. 4 depicts the heating device with a first heat-conducting plate on the heating support.
Figure 5:
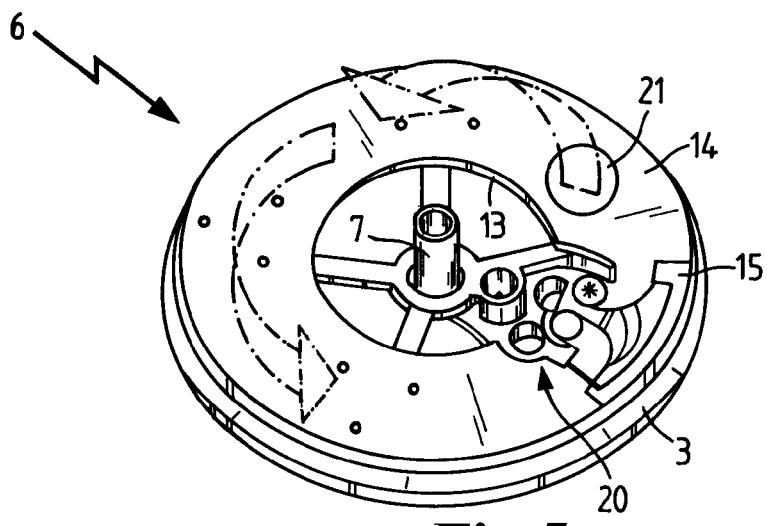
FIG. 5 depicts the heating device with a second heat-conducting plate.

FIGS. 3 to 5 show the heating device 6 in different installation stages in a perspective directed towards the interior side of the cover 3. For heating, the unfiltered fluid flows through an inflow opening 18 to the interior side of the cover 3, the inflow opening 18 being incorporated into the cover and communicates with the inlet fitting 5 (FIG. 1, 2). The heating support 15 which supports the heat-conducting plates is located on the interior side of the cover 3. As indicated by the flow arrows, the flow first circulates in circumferential direction between the interior side of the cover 3 and the exterior side of the nearest heat-conducting plate which is disposed parallel to the interior side of the cover.

FIG. 4 shows the heating device 6 with the first heat-conducting plate 13 which features a flow opening 19 through which the fluid flows from the flow chamber between the interior side of the cover and the exterior side of the heat-conducting plate 13. As indicated by the arrows, the fluid can then flow in circumferential direction at the interior side of the heat-conducting plate 13 in the opposite direction to the flow as shown in FIG. 3.

Furthermore, at the interior side of the heat-conducting plate are disposed heating elements 16 which are preferably designed as electric PTC elements and which heat the heat-conducting plates. The heat input is then realized by the heated heat-conducting plates to the fluid passing along the lateral surfaces of the heat-conducting plates. Altogether, three heating elements 16 disposed across the circumference are provided.

The heat-conducting plate 13 as well as the heat-conducting plate 14 (FIG. 5) have a ring-shaped design and feature a central recess through which passes, for example, the outlet fitting 7 for discharging the cleaned fluid. Moreover, the heat-conducting plates are not continuous, but extend only across an angular segment of approximately 330°, connections 20 being disposed in the remaining free segment which are part in particular of the connection block 12 (FIG. 1).

FIG. 5 shows the completely installed heating device 6. The second heat-conducting plate 14 is also installed at the heating support 15 and is placed parallel and at a certain distance to the first heat-conducting plate 13 located below. Into the second heat-conducting plate 14 is incorporated another flow opening 21 via which the fluid can pass from the intermediate fluid chamber between heat-conducting plates 13 and 14 which then—as shown by the arrows—flows in circumferential direction along the exterior side of the heat-conducting plate 14. The fluid is now heated and can pass to the raw side of the filter element.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A fluid filtering device for the fuel of an internal combustion engine, comprising:
a filter housing including:
a cover closing an open end of the filter housing;
a water collecting chamber arranged within said filter housing;
a water outlet connection; and
a drainage channel arranged within said filter housing and in fluid flow communication with said water collection chamber, said drainage channel arranged to deliver collected water to the exterior of the filter housing through said water outlet connection;
a filter element disposed in said filter housing; and
a heating device disposed at the interior side of said cover, said heating device disposed in a flow path of the fluid, said heating device including:
a heating support disposed at the interior side of the cover;
at least one heating element which is supported by said heating support; and
a water outlet connection which is directed outwardly from the housing through a recess in the cover, said water outlet connection one piece with said heating support; wherein said drainage channel is connected with the heating support; and
a central tube arranged within said filter element in said filter housing and configured to support said filter element; and at least one sealing lip having a step portion and a ramped portion, said sealing lip having a first sealing lip portion provided on said central tube and a complimentary sealably engaging second sealing lip portion provided on said drainage channel; wherein said second portion of said sealing lip is integrally molded to said drainage channel.

2. The filtering device according to claim 1, further comprising:
at least one electrically conductive contact pin electrically connected with the heating support and passing through a recess in the cover.

3. The filtering device according to claim 2, further comprising:
a water level detector disposed in the filter housing and operable to detect water level in said water collecting chamber; and
at least one electrically conductive contact pin electrically connected with said water level detector.

4. The filtering device according to claim 3, wherein said water level detector is disposed in or at the drainage channel.

5. The filtering device according to one of the claim 1, wherein that the heating support is designed as plastic part.

6. The filtering device according to one of the claim 1, further comprising:
a fluid outlet fitting arranged on said housing; and
outlet fitting sealing lips integrally molded to said outlet fitting configured to form a fluid seal with said heating support or a component connected with the drainage channel.

7. The filtering device according to one of the claim 6, further comprising:
a fluid inlet fitting arranged on said housing; and
said fluid inlet fitting and said fluid outlet fitting are connected with said heating support and said fittings pass through recesses in the cover.

8. The filtering device according to one of the claims 7, wherein
said heating device comprises at least one heat-conducting plate arranged to conduct heat generated by said at least one heating element to fluid to be heated in said housing.

9. The filtering device according to claim 8, wherein at least two heat-conducting plates are provided in a spaced parallel relationship defining an intermediate fluid chamber therebetween operable to heat the fluid to be heated.

10. The filtering device according to claim 9, wherein said at least one heating element is disposed between said at least one heat-conducting plates.

11. The filtering device according to claim 8, wherein said at least one heat-conducting plate is electrically conductive and forms an electrically conductive part of an electric circuit heating said at least one heating element.

12. The filtering device according to claim 1, wherein said filter element is hollow cylindrical in shape and is configured to be flowed through by the fluid in radial direction.

13. The filtering device according to claim 1, wherein the cover is firmly connected with the filter housing by hemming a cover edge to an edge of said filter housing.

* * * * *